Oct. 17, 1944.    L. MOUNTBATTEN    2,360,361
STATION KEEPING APPARATUS FOR WARSHIPS
Filed Jan. 5, 1939    9 Sheets-Sheet 3

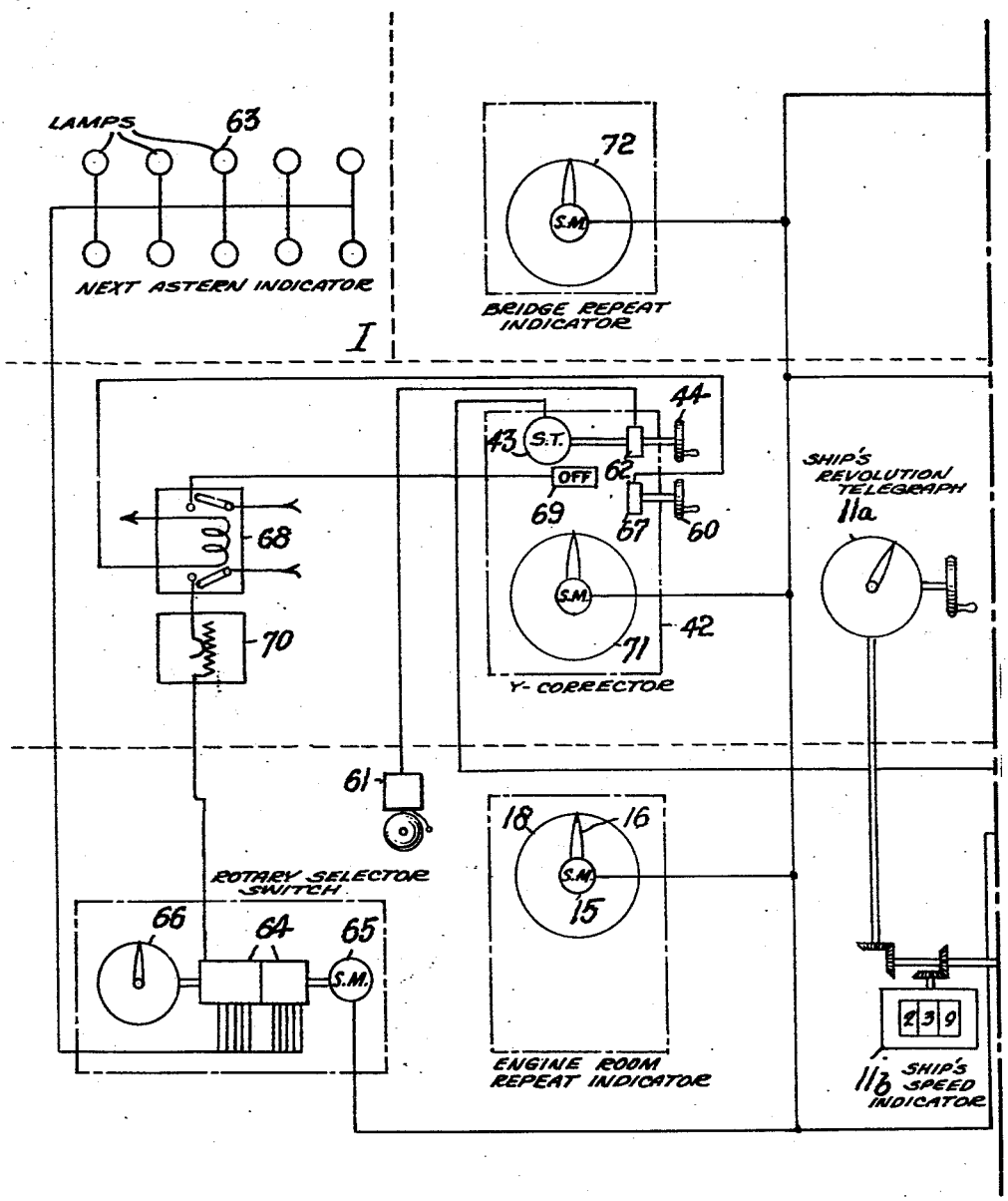

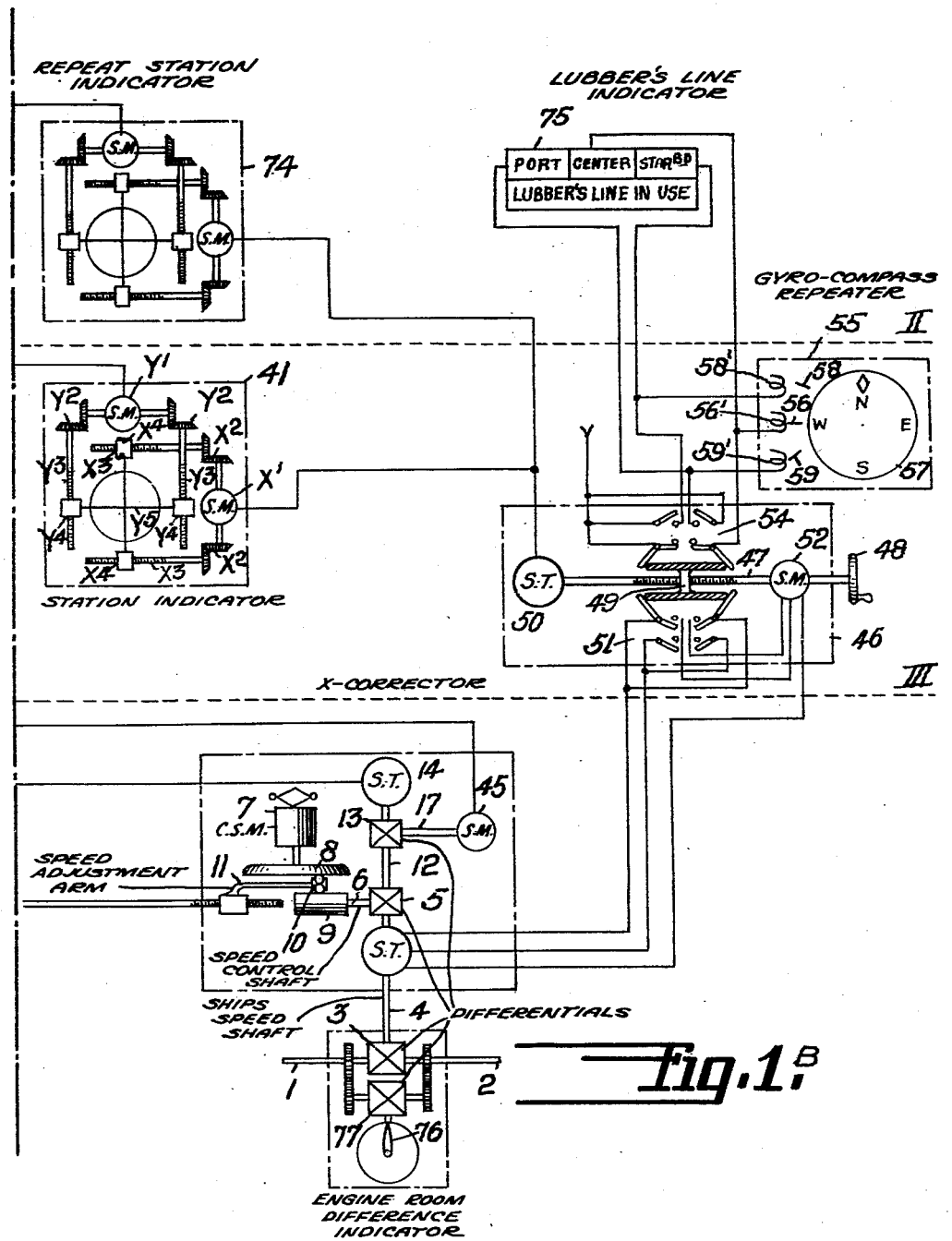

INVENTOR
LOUIS MOUNTBATTEN
BY
HIS ATTORNEY

Oct. 17, 1944.  L. MOUNTBATTEN  2,360,361
STATION KEEPING APPARATUS FOR WARSHIPS
Filed Jan. 5, 1939  9 Sheets-Sheet 4

INVENTOR
LOUIS MOUNTBATTEN
HIS ATTORNEY

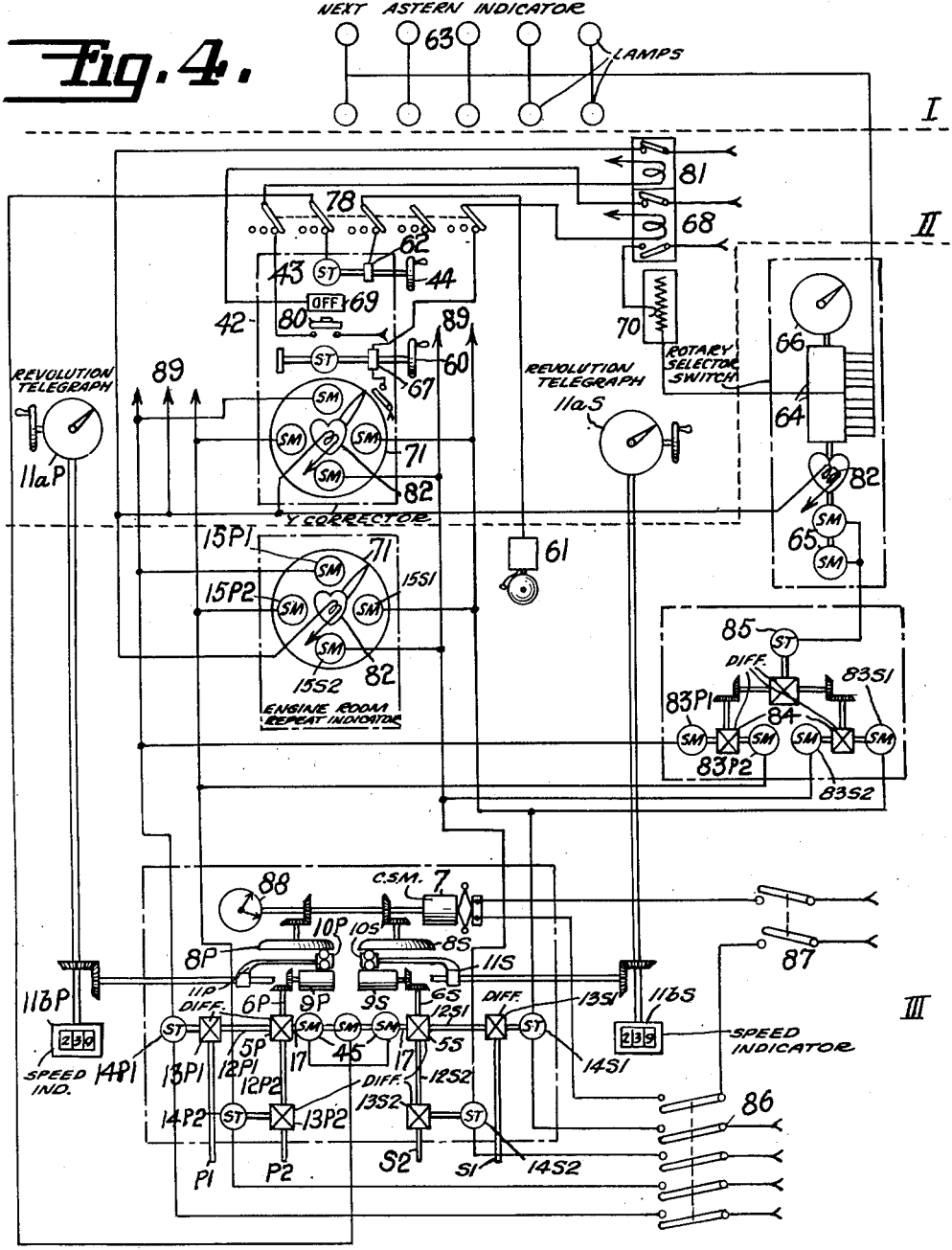

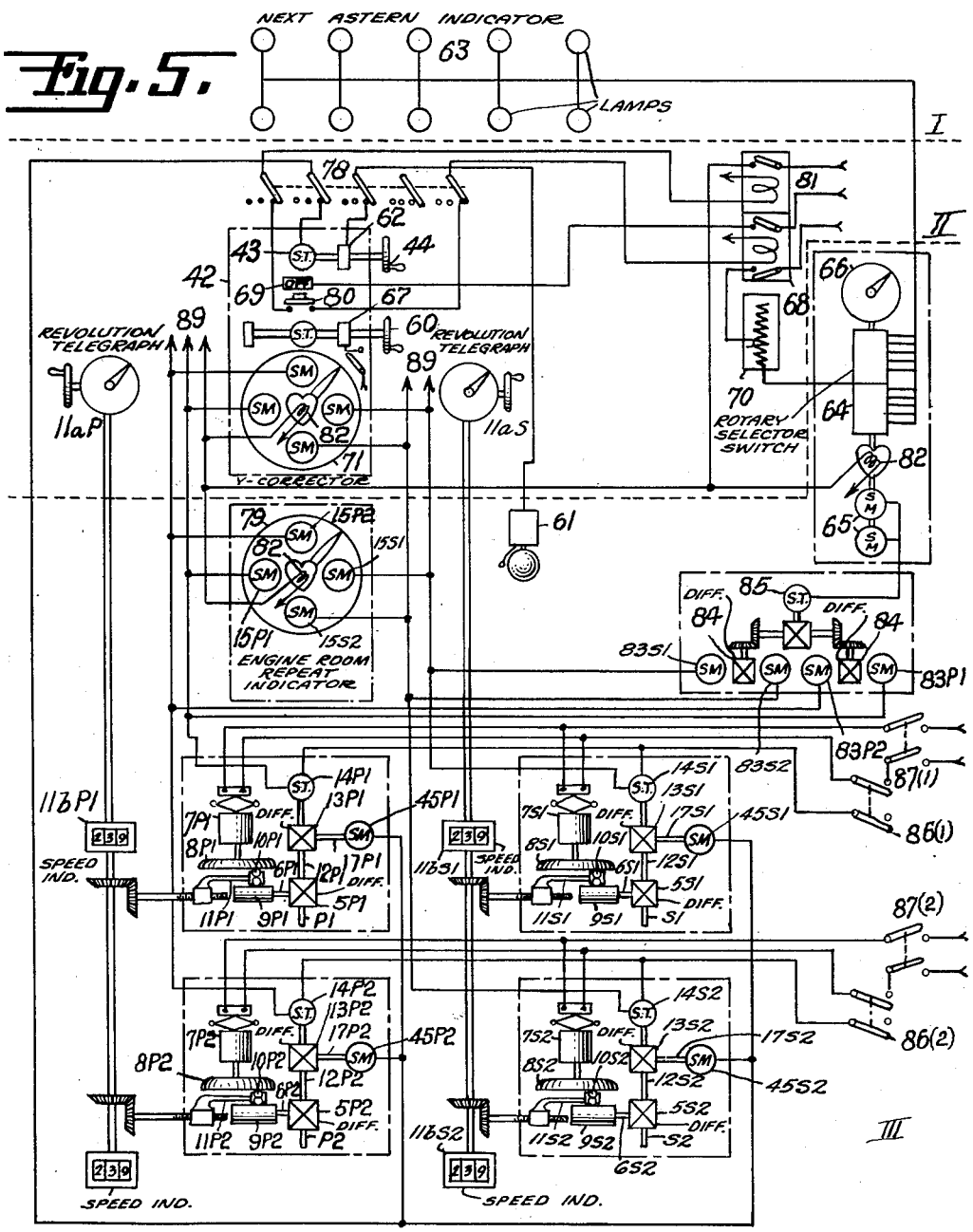

Oct. 17, 1944.  L. MOUNTBATTEN  2,360,361
STATION KEEPING APPARATUS FOR WARSHIPS
Filed Jan. 5, 1939  9 Sheets-Sheet 8

INVENTOR
LOUIS MOUNTBATTEN
BY Herbert H. Thompson
HIS ATTORNEY

Oct. 17, 1944.  L. MOUNTBATTEN  2,360,361

STATION KEEPING APPARATUS FOR WARSHIPS

Filed Jan. 5, 1939 9 Sheets-Sheet 9

INVENTOR
LOUIS MOUNTBATTEN
HIS ATTORNEY.

Patented Oct. 17, 1944

2,360,361

UNITED STATES PATENT OFFICE 2,360,361

STATION-KEEPING APPARATUS FOR WARSHIPS

Louis Mountbatten, London, England

Application January 5, 1939, Serial No. 249,539
In Great Britain January 6, 1938

24 Claims. (Cl. 114—0.5)

This invention relates to station keeping apparatus for warships. The problem of "station keeping" is that of maintaining a ship which is proceeding with others in formation in its correct relative position with respect to the adjacent ships.

Apart from the question of appearance, accurate station keeping is important from a tactical point of view. For example, in a torpedo attack by a flotilla of destroyers, each destroyer commences to turn away from the target at a particular point and, at the exact instant when the torpedo tubes are correctly trained by virtue of the turning of the ship, fires its torpedoes. It is obvious that unless correct station keeping has been maintained during this maneuver, one destroyer may easily get in the way of another's line of fire at the critical instant and thus prevent the latter ship from firing its torpedoes. Again, it is sometimes necessary for ships taking part in an action to calculate the relative position of an enemy for gunnery purposes from data supplied by the leading ship, and since this involves an accurate knowledge of their own position with respect to this ship it is again obvious that accurate station keeping is necessary.

In general, the types of formation employed all involve keeping the ships in a straight line known as a "line of bearing" with a fixed distance between adjacent ships. According to whether this line of bearing is coincident with, oblique to, or at right angles to the course being steered, the formation is referred to respectively as "line ahead," "quarter line," or "line abreast."

In order to maintain a ship in its correct station it is the duty of the commanding officer to keep the ship at the correct bearing with respect to, and at the correct distance from, a specified ship known as the guide, which in general is the leading ship in the line. This obviously involves (1) control of the speed at which the ship is travelling, and (2) control of the course being steered.

Hitherto the practice has been that when the commanding officer has seen, by observations of range and bearing, that his ship is out of station with respect to the guide, he has simply ordered an appropriate temporary alteration of course and/or speed to bring the ship back into correct station. Thus, assuming that the commanding officer of a ship steaming in line ahead formation observes that he is too far astern of the preceding ship, he orders an increase of speed, and has to judge exactly when to revert to the normal speed in order that the ship's added momentum may just carry it into correct station without "over-shooting the mark."

Such operations demand a high degree of concentration on the part of the commanding officer at a time when he may have many other things to attend to. Moreover, the engine room artificer has no idea how long the increased speed is to last, and is thus unable to utilise his fuel to the best advantage.

The object of the present invention is to overcome these disadvantages by the provision of apparatus specifically designed to facilitate station keeping, and thus to increase the efficiency of warships utilising the said apparatus.

According to the invention, station keeping apparatus for warships comprises means for controlling the speed of the ship and the course steered thereby for the purpose of maintaining the ship, within the closest possible limits, in a fixed position with respect to another ship serving as a guide.

Considering an ideal case, in which the guide itself is assumed to be travelling on an absolutely fixed course at a constant speed, it is obvious that any ship which is initially in correct station, and which is caused to travel on exactly the same course and at exactly the same speed as the guide, must constantly remain in correct station. In practice it would, however, seldom be possible to maintain this degree of accuracy, and it is therefore desirable to provide means for effecting periodic corrections of the ship's position. The employment of such means is also necessary when changes of formation are called for.

According to a preferred feature of the invention, therefore, the station keeping system incorporates means for determining any displacement of the ship from its correct position with respect to the guide, and means for effecting a controlled variation of the ship's speed and/or course for the purpose of restoring the ship to the said correct position. This part of the apparatus will be referred to for convenience as the "correction system."

When the ship is in correct station, it is obviously desirable to maintain as accurate a control as possible over the speed and course being steered, in order to minimise the frequency with which it is necessary to use the correction system, and the magnitude of the corrections that have to be applied. The accuracy of adherence to the correct course must depend primarily upon the helmsman, whose duty it is to maintain the appropriate graduation on the card of the gyro compass repeater by which the ship is steered in accurate alignment with the fixed index or "lubber's line" against which this card is read. In order that the speed of the ship may be controlled with comparable accuracy, the invention provides speed-control apparatus which will first be described in its simplest form as applied to a destroyer, after which the associated correction system will be considered in its bearing upon both the "speed-control" and "course-control" aspects of the problem. Finally the system will be described as applied to warships of the larger classes.

Reference will now be made to the accompanying drawings in which:

Figure 1A and B is a purely diagrammatic layout of the whole system in its preferred form as applied to a destroyer, Figure 2 is a diagram illustrating mathematically the basic problem to be solved by the correction system, Figure 3 is a plan view showing the essential components of an instrument, hereafter termed a "station indicator," which forms the basis of the correcting system, Figures 4 and 5 are diagrammatic layouts of alternative arrangements of the speed-control system as applied to a cruiser, Figure 6 is a detail view of the dial of a type of indicator used in the arrangements of Figures 4 and 5.

Figure 2:
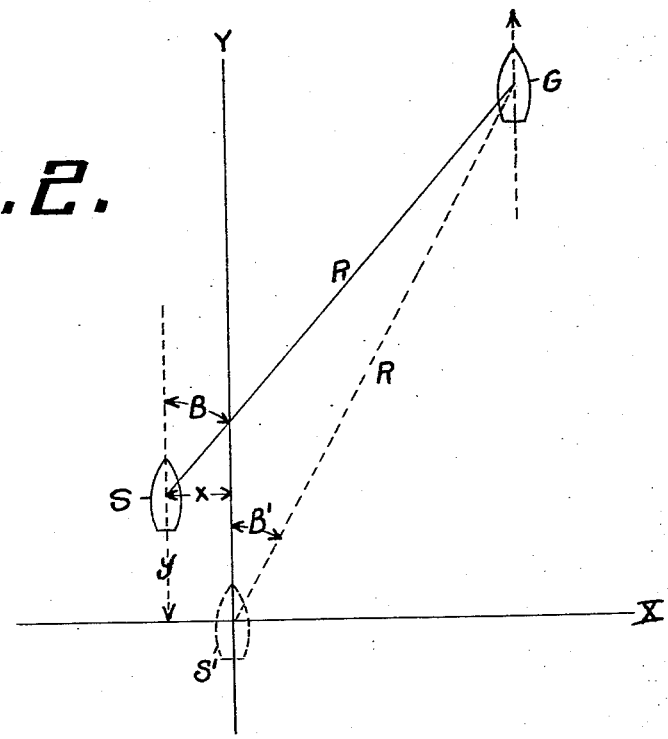

The speed control aspect of the system will first be discussed with reference to Figure 1. Two shafts 1, 2, operated respectively from the port and starboard engines (not shown), are coupled through a differential gear 3 to a third shaft 4, hereafter referred to as the "ship's speed shaft." The rate of rotation of this shaft, which is actually proportional to the mean of the speeds of the two engines, is assumed to be proportional to the actual speed of the ship through the water. Actually this assumption is not strictly correct, but it has been found by experiment to be sufficiently so for all practical purposes. It will, however, be obvious that if desired the ship's speed shaft may be suitably operated from the ship's log.

The shaft 4 passes into a second differential 5 together with a speed-control shaft 6 operated by a constant-speed electric motor 7 through continuously variable gearing. This gearing is of the known type in which a frictional drive takes place between a disc 8 and a drum 9 through the medium of a pair of balls 10 which are adjustable radially with respect to the disc for varying the ratio of the drive. The disc is driven by the constant speed motor 7, and the arm 11 controlling the position of the balls (hereafter referred as as the "speed-adjustment arm") is set in accordance with the pre-determined speed at which the ship should travel; this arm may conveniently be operated, as shown, from the standard revolution telegraph 11a by which instructions as to engine speed are normally transmitted to the indicator 11b. The drum 9, which drives the speed-control shaft 6, is thus caused to rotate at a rate proportional to this pre-determined speed; moreover, the ratios of the various drives are so chosen that the rate of rotation of the speed control shaft 6 bears the same proportion to the predetermined speed as does that of the ship's speed shaft 4 to the actual speed of the ship.

The two shafts 4, 6 are coupled in opposition in the differential 5, and it follows that the third member 12 of the differential will in general rotate at a rate proportional to the difference between the ship's actual speed and the predetermined speed, and will remain at rest if these two speeds are identical. This member 12 is coupled through a further differential 13 to the self-synchronous transmitter (S.T.) 14 of an electrical self-synchronous transmission system of any convenient kind, such as a system employing well-known "Selsyns" or "Autosyns" as self-synchronous generators (transmitters) to transmit electrical voltages, indicative of the position of their rotors, to similar self-synchronous motors (receivers), the rotors of which are thereby caused to follow the movements of the rotors of the generators. Transmitter 14 is coupled to a self-synchronous motor (S.M.) 15 which operates a pointer 16 visible to the engine room artificer. (It may here be noted that the electrical transmission system may be of any type in which the angular position of an object at the sending end of the system is repeated accurately by another object or indicator at the receiving end of the system. Wherever a motor or receiver is required to drive a load too large to be driven by the motor alone without affecting the accuracy of the transmission system, the motor is to be understood as including any well-known type of power follow-up system or torque amplifier.)

In the absence of any movements of the third member 17 of the differential 13 (the function of which will be described later) the pointer 16 is thus caused to follow exactly the movements of the shaft 12. This pointer moves over a dial 18 having a zero position marked thereon; assuming the pointer to coincide with this zero position when the ship is accurately in station, it will be obvious that at any subsequent time (in the absence of the small errors discussed in the next paragraph) its angular displacement from this position, in one direction or the other, will be a measure of the actual distance that the ship is ahead or astern of station. The dial 18 is accordingly graduated to show such departures directly in yards, distances ahead being measured in one direction from the zero position and distances astern in the other.

The duty of the engine room artificer is to control the speed of his engines so that the pointer 16 always keeps accurately on the zero position. In the complete absence of any errors, or alterations to the formation of the flotilla, this would be sufficient to ensure perfect station keeping as far as the "speed control" aspect of the problem is concerned. In practice, however, small errors creep in due to minute fluctuations in the working of the constant speed motor 7 and lack of strict proportionality between ship's speed and engine speed, and the cumulative effect of such errors causes the ship to wander slightly from its correct station even though the pointer 16 is kept accurately on the zero mark. A similar effect is produced by the inevitable slight wandering of the ship from its correct course. For the purpose of effecting the periodic correction of the ship's position after such wandering has occurred, and for the further purpose of effecting changes of station called for by any alteration of formation, a correction system is provided. This system will now be described.

Referring now to Figure 2, we may consider a horizontal plane which is moving with the guide G in the direction of the course being steered thereby. This plane will be termed the guide-plane. The ship S to which the station keeping system is to be applied, and on which the apparatus is situated, has a certain correct position S' on this plane. This position may be considered as the origin of a system of rectangular co-ordinates, the Y axis being taken as parallel to the course being steered by the guide G and the X axis at right angles thereto. The prefixes X and Y will be used in the ensuing description to denote pieces of apparatus specifically associated with these axes.

Any position of the ship on the guide-plane may now be defined in terms of its X and Y co-ordinates, and unless both these co-ordinates are zero the ship is out of station. If the speed of the ship is varied, without altering its course, it will move relatively to the correct position in the direction of the Y axis; while if the course is altered slightly, without varying the speed, it will move substantially in the direction of the X axis. (Note: the assumption made here is that the angle by which the course is changed is sufficiently small for its cosine to be considered substantially equal to unity.) It is thus obvious that by a combination of change of speed and change of course the ship can be brought back into its correct station in all cases. The systems of apparatus for effecting the control or correction of the X and Y components will be termed the X and Y control systems respectively.

The problem to be solved may be summarised as follows. The correct position S' of the ship is determined by the correct values of the range and bearing of the guide, which, of course, are known. These values are indicated respectively by R' and B'. The actual position S of the ship is likewise determined by the actual range R and actual bearing B, which may readily be measured in known manner. Given the above data, it is required to find the co-ordinates $x$ and $y$ of the ship's actual position, and thus to determine and apply the speed and course corrections necessary to bring the ship back into its correct station. (Note: in practice it is usually convenient that B and B' shall be expressed as compass bearings, and the angles B and B' on Figure 2 will therefore represent the actual bearing angles on the assumption that the course steered is due north.)

Figure 3:
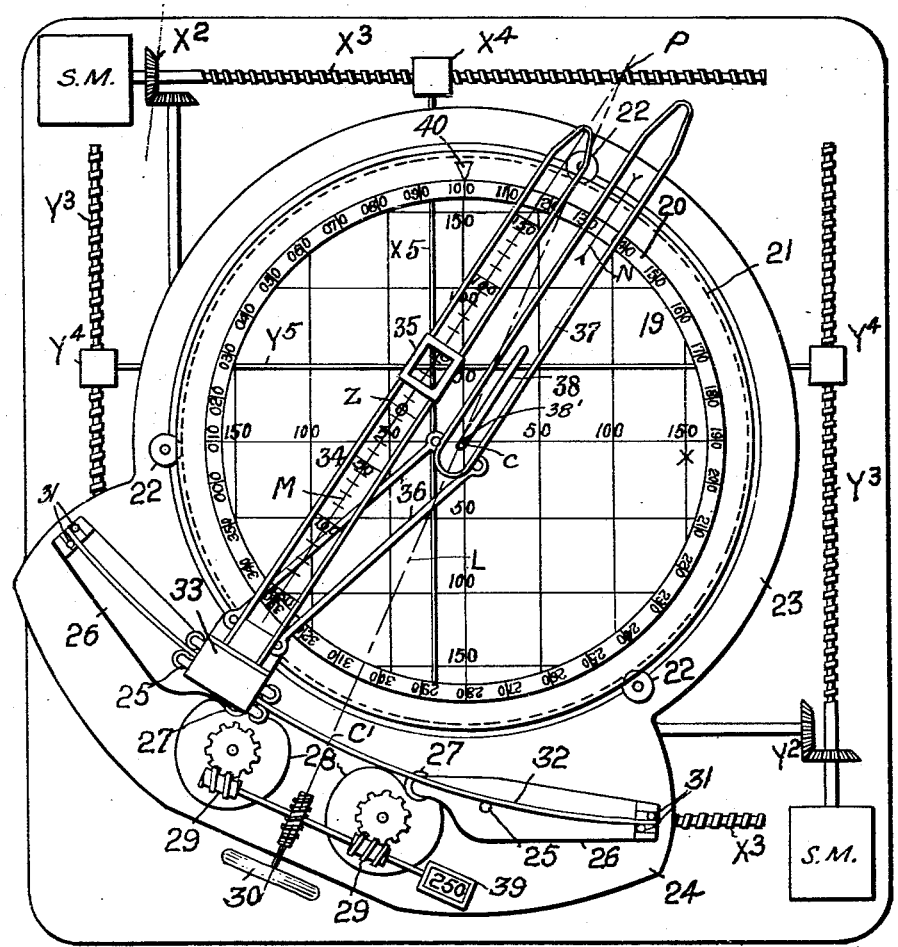

The instrument which determines the co-ordinates $x$ and $y$ of the ship's position is hereinafter termed a station indicator, and is illustrated in Figure 3, which shows the instrument with part of the casing removed to expose the internal mechanism. This instrument, in its preferred form, comprises a circular dial 19 having round its periphery a rotatable annular scale 20 calibrated in degrees. The face of the dial is, as shown, calibrated in squares in the manner of graph paper, and represents a section of the guide plane, the centre C of the dial representing the correct position S' of the ship—that is the origin of the system of co-ordinates referred to. The X and Y axes are marked on the dial and are calibrated to represent distances on the guide plane to any convenient scale, for example 20 yards to one inch.

Concentric with the dial 19 is a cylindrical bearing surface 21 engaged by roller bearings 22 which are mounted on an annular extension 23 of a carriage 24. This carriage is thus capable of rotation in a plane parallel with the dial 19 about the centre C thereof. Pivotally mounted at points 25 on the carriage 24 are a pair of symmetrically arranged rockers 26 carrying at their inner ends rollers 27 which engage a pair of similar but oppositely arranged cams 28; these cams are capable of being rotated in opposite directions by means of gearing 29 operated by a hand-wheel 30. The outer end of each rocker 26 carries a pair of small rollers 31 between which runs a flexible rail 32 which is initially bent to assume the form of a circular arc.

Rotation of the handwheel 30 causes the cams 28 to operate upon the rollers 27 and thus rotate the rockers 26 in opposite direction. The pairs of small rollers 31, which, as shown, are arranged in a staggered relationship with respect to the rail 32, are thereby caused to apply bending moments to the ends of the rail, which is thereby flexed in a plane parallel with that of the dial 19 in such a direction as to straighten it. The rail may thus be made to assume the form of a circular arc having, within limits, any desired radius. The bending mechanism is so arranged that the central point C' of the rail would, in the absence of any further constraint, always remain in a fixed position with respect to the carriage 24, but to prevent any slipping in the direction of its length the rail is lightly anchored to the carriage at this point. The tangent to the rail at this point is, moreover, always normal to the line L which passes through this point and the centre C of the dial. It follows, therefore, that the centre of any arc to which the rail is bent must always lie on the line L.

Slidably mounted on the rail is a light carriage 33 (hereinafter referred to as the pointer carriage) to which is secured a pointer 34 comprising a bar of transparent material which extends over the dial 19; this pointer is marked with a longitudinal centre line M calibrated as hereinafter described, and carries a light cursor 35 adjustable along its length. The pointer 34 is rigidly mounted on its carriage 33 so that the line M is always radial to any circular arc to which the rail 32 is bent; this centre line M is hereafter referred to as the "pointer line," which term includes the continuation of this line beyond the actual end of the pointer. As the pointer carriage 33 is moved round the rail 32, the pointer 34 will therefore move as though about a fixed pivotal point P which coincides with the centre of curvature of the rail. This point P coincides, also, with the point of intersection of the lines L and M.

The central position of the pointer 34, that is its position when the pointer carriage 33 is located symmetrically about the fixed centre C' of the rail, will be referred to as the zero position of the pointer. From what has been said, it will be clear that when the pointer is in this position the pointer line M will always pass over the centre C of the dial 19, no matter what may be the setting of the carriage 24. The position on the pointer line M which lies over the centre C of the dial under these conditions is made the zero point Z on the longitudinal scale of the pointer;

to either side of the zero point, i. e. towards and away from the rail 32, the pointer line M is graduated to the same scale as that used for marking the face of the dial 19. This scale will be termed the "pointer scale."

Pivotally secured to the pointer carriage 33, and capable of passing freely beneath the pointer 34, are two similar links 36 the other ends of which are pivoted to the base of a second transparent pointer 37 (hereafter termed the auxiliary pointer), the arrangement constituting a parallel linkage whereby a constraint is applied to the pointer 37 such that its centre line N is always parallel with the line M. A slot 38 formed in the pointer 37 in the direction of the line N engages a pin 38' projecting from the dial 19 at the centre C thereof, and this arrangement provides a further constraint whereby the line N is caused always to intersect the centre C. Thus when the pointer 34 is in its zero position it lies directly above the pointer 37, and the lines L, M and N lie in the same vertical plane; as the pointer carriage 33 is moved round the rail 32 the pointer 34 moves, as previously stated, as though about a pivot at P, while the pointer 37 rotates about the centre C (the slot 38 sliding with respect to the pin at C) and remains parallel with the pointer 34.

Assuming that it has been found, by measurements of range and bearing of the guide, that the ship is out of station, the device is used in the following manner to determine the necessary corrections. The mechanism for bending the rail 32 is first operated so that the rail is formed into an arc of a circle having a radius equal to the correct range R' of the guide, expressed in terms of the scale employed, plus the fixed distance CC'. This is done by rotating the handwheel 30 until the value of the correct range R' appears on an indicator 39 coupled to the rail bending mechanism, when the rail will be set to the correct curvature. Next the annular scale 20 is set so that the course being steered by the flotilla appears opposite an index 40.

The pointer 34 is now set to its zero position on the rail 32, in which position, as previously stated, the zero Z of the pointer scale will always coincide with the centre C of the dial 19, however the carriage 24 may be adjusted. This carriage is now trained so that the pointer lines M and N (which now coincide, of course, with the line L) indicate on the scale 20 the correct compass bearing B' of the guide. The carriage 24 is now clamped in position by suitable locking means (not shown).

Since the pointer line M now passes over the centre C of the dial (representing the correct position S' of the ship in Figure 2) and points in a direction representing the correct bearing of the guide, it must pass over a fixed point (either on or off the dial) representing the position G of the guide. This point lies on the pointer line M at a distance from the centre C of the dial equal, on the scale employed, to the correct range R' of the guide; from the foregoing description it will be seen that this point therefore coincides with the centre P of the arc to which the rail 32 has been bent. Thus, if the pointer 34 is now adjusted to any position on the rail, it will move as though about a fixed pivot at P, and the zero Z of the pointer scale will trace out an arc which is the locus of points having the correct range from the guide.

The carriage 33 is now adjusted on the rail 32 until the centre line N of the auxiliary pointer 37 indicates, on the scale 20, the actual compass bearing B of the guide. The angle between the lines L and N is now equal to the error of bearing (B—B'), and since this angle is equal to that between the lines L and M (that is, the angle through which the pointer 24 has swung about the point P) it will be clear that the line M now corresponds in direction with the actual line of bearing of the ship from the guide, and must, therefore, pass over a point representing the actual position of the ship. The zero Z on the pointer scale now represents a point having the actual bearing but correct range; it is, therefore, only necessary to set the cursor 35 to a position on the pointer scale which indicates the difference R—R' between the correct and actual range (the direction from the zero being determined by the sign of this difference) and the cursor will now lie over a point on the dial 19 representing the actual position S of the ship in Figure 2. The co-ordinates $x$ and $y$ of the ship's actual position may now therefore, be read directly on the dial 19 by reference to the calibrated X and Y axes thereon.

Consideration will now be given to the preferred means for restoring the ship to its correct station. This involves separate corrections of the $x$ and $y$ components of the ship's displacement by controlled variation of the course and speed respectively. Part of the apparatus concerned is enclosed in the casing of the station indicator, and the actual arrangement of this apparatus is shown in Figure 3. This part of the apparatus is also indicated schematically in Figure 1, within the rectangle 41 which represents the station indicator. The Y-correction system will first be considered, reference being made to Figures 1 and 3.

A self-synchronous motor Y1 coupled to the transmission system which operates the engine room pointer 16 drives, through bevel gears Y2, a pair of parallel screwed shafts Y3 which run on opposite sides of the station indicator dial 19 in a direction parallel to the Y axis. These screwed shafts carry internally threaded members Y4 which are connected by a taut wire Y5 running over the station indicator dial 19 beneath the pointers 34, 37 in a direction parallel to the X axis, with which the wire coincides (passing over the centre C of the dial) when the engine room pointer 16 is at zero. As the transmission operates to move the pointer 16 off the zero mark, the motor Y1 operates to move the wire Y5 in a direction at right angles to its length along the Y axis; the arrangement is such, in fact, that the wire indicates on the scale of the Y axis (in one direction or the other from the centre C) the same distance as that indicated by the engine room pointer 16 on the dial 18.

Located in a suitable position near the station indicator (which may conveniently be situated in the wheel house) is an assembly 42 (Figure 1) hereafter referred to as a "Y-corrector." This comprises a number of pieces of apparatus located for convenience within a single casing, among which is a self-synchronous transmitter 43 operable by a hand wheel 44. The transmitter 43 is coupled to a self-synchronous motor 45 which is coupled to the third member 17 of the differential 13. Rotation of the handwheel 44 thus brings about a corresponding rotation of the member 17, which is passed on through the differential 13 and transmitter 14 to the motors 15 and Y1, thereby bringing about a movement of the pointer 16 and wire Y5.

Let it now be assumed that although the engine room artificer has controlled the speed of the engines so as to keep the pointer 16 accurately on the zero mark, the cumulative effect of the small errors previously referred to has resulted in a slight wandering of the ship from its correct station. Assuming further that the station indicator 41 has been used in the manner described to find the actual position of the ship, the following operations are now carried out in order to effect the necessary correction.

The officer in charge rotates the handwheel 44, thereby bringing about a movement of the wire Y5 from its zero position in the manner previously described, until this wire passes accurately beneath the datum mark on the cursor 35. The pointer 16, which will have moved correspondingly, will now indicate on the dial 18 the distance ahead or astern through which the ship must move relatively to the guide in order to eliminate the $y$ component of its displacement.

The engine room artificer now decreases or increases the speed of the engines (according to whether the ship is ahead or astern of station), so that a resultant motion will be imparted to the member 12, transmitter 14 and motor 15, thus moving the pointer 16 back towards the zero position. As the engine room artificer sees the pointer 16 gradually approaching the zero mark, it is a comparatively easy matter for him to judge exactly when to revert to normal speed so that the pointer just comes to rest at the zero position without "overshooting the mark." From what has been said it will be clear that when this occurs, the ship will have been given exactly the correct displacement ahead or astern relatively to the guide to eliminate the $y$ component of the error of station. Simultaneously the wire Y5 will have been restored to coincidence with the X axis on the dial 19.

The X-control system is based on the following principle: If the ship's speed is V and its course is altered by a small angle A to port or starboard, it will "creep" relatively to the guide in the direction of the X axis with a speed V sin A. If the angle A is sufficiently small for its cosine to be considered substantially equal to unity, the component of the ship's speed in the direction of the true course may be taken as V for all practical purposes and the Y control system will be unaffected.

For the purpose of correcting the component $x$ of the ship's displacement from its correct position an instrument 46, Figure 1, which may be termed an "X-corrector" is employed. This comprises a screwed shaft 47 adapted to be rotated by a handle 48 through a dog clutch (not shown) which may be disengaged or engaged at will, this shaft 47 carrying an internally threaded member 49 which, as it is moved from a neutral position by virtue of the rotation of the shaft 47, operates a system of contacts as hereafter described. The member 49 also preferably carries a pointer (not shown) which moves over a linear scale on the casing of the instrument.

The shaft 47 also operates a self-synchronous transmitter 50 connected to a motor X1 which operates a system for moving a wire X5 over the dial 19 of the station indicator exactly similar to the system employed for the Y correction system, except that the wire X5 is parallel to the Y axis and moves in the direction of the X axis. This system is designated by reference symbols corresponding with those used for the Y system except that Y is replaced by X. The wire X5 is arranged to be at its zero position over the centre C of the dial 19 when the member 49 is in its neutral position.

In operation, the officer in charge, when setting the wire Y5 to intersect the centre of the cursor 35 on the station indicator, simultaneously engages and rotates the handle 48 of the X-corrector 46 so that the self-synchronous transmission system 50, X1 operates to move the wire X5 until it, too, passes beneath the centre of the cursor 35. As soon as the member 49 leaves its neutral position it operates a system of contacts 51 which connect a step-by-step motor 52 coupled to the screwed shaft 47 with a permanently running transmitter 53 operated by the "ship's speed shaft" 4 of the system previously referred to. Simultaneously contacts 54 are operated which are associated with the gyro compass repeater 55 by which the ship is steered in the following manner.

In addition to the normal index or "lubber's line" 56 against which the compass card 57 is read, further lubber's lines 58, 59 are provided, these being located at equal small angles (for example, 5°) on each side of the line 56. The lines 56, 58, 59 are arranged to be illuminated respectively by three lamps 56', 58', 59' which are connected to the contact system 54. With the member 49 in its central position, the normal lubber's line 56 is illuminated by the lamp 56', but immediately this member is moved from its central position the contact system 54 is operated to light one or other of the lamps 58' or 59' (according to the direction of displacement of the member 49), thereby illuminating the corresponding lubber's line 58 or 59. Simultaneously the lamp 56' is extinguished. The duty of the helmsman is to continue to steer the same course as previously ordered, but this must now be read against the new lubber's line; the helmsman is therefore forced to alter the ship's actual course by a small predetermined angle in either direction in order to bring this about, and this causes the ship to "creep" relatively to the guide in the direction of the X axis.

Immediately the wire X5 on the station indicator is lined up with the cursor 35, the handle 48 of the X-corrector is disengaged, and the now energised self-synchronous motor 52 coupled to the screwed shaft 47 rotates the latter in such a direction as to restore the member 49 to its neutral position. When it reaches this position, the contacts 51 are opened so that the motor 52 stops and simultaneously the normal lubber's line 56 is illuminated once more, so that the helmsman restores the course to normal. Since this restoring action is controlled by the "ship's speed shaft" 4 operated from the engines or log, the velocity of the member 49 is at all times proportional to the ship's actual speed, and also, since the angle by which the course has been changed is fixed, to the speed of the ship's lateral "creep." It is, therefore, clear that by choosing the constants of the apparatus correctly the ship can be made to come exactly into station (as regards the component $x$ of its displacement) as the member 49 reaches its neutral position, at which point the course is restored to normal. Simultaneously with the restoring of the member 49, the transmission 50, X1 operated by the screwed shaft 47 restores the wire X5 on the station indicator to its zero position over the centre C of the dial 19. It will be understood that the sign of the component $x$ of the ship's displacement determines the direction in which the member 49 must be moved in order to line up the wire X5 with the cursor 35, and this in turn determines which of the lubber's lines 58, 59 is used, also the direction of rotation of the restoring motor 52, which is always such as to re-centre the member 49.

From the above it will be seen that once the point representing the ship's actual position has been found on the station indicator dial 19, it is only necessary for the officer in charge to bring about an intersection of the wires X5 and Y5 on this point, after which simple pointer-following operations on the part of the helmsman and engine room artificer will automatically bring the ship back into correct station.

The essentials of the system having now been described, consideration will be given to certain auxiliary apparatus. It is necessary that provision shall be made for transmitting certain standard orders to the engine room in connection with the use of the Y-control apparatus, such as orders as to whether a correction is to be carried out at a normal rate, slowly, or rapidly. Such orders are transmitted by means of a handwheel 60 on the Y-corrector 42 which operates a self-synchronous transmission (not shown) whereby the orders are made to appear on a suitable indicator in the engine room, and a similar transmission (also not shown) is provided for enabling the engine room artificer to send back acknowledging signals. Gongs are provided at both ends for drawing attention to the various indicators; for example, a gong 61 in the engine room is connected to a contact system 62 operated automatically when the handwheel 44 is rotated, so that an audible warning is given that a correction is being set on the dial 18.

It is frequently desirable for the commanding officer of a ship to know how the next ship ahead in the line is behaving as regards station keeping. This is particularly necessary, for example, when a simple "line ahead" formation is being followed, in which case each ship may, for convenience, take observations of range on the next ship ahead instead of directly on the guide. For this reason the electrical transmission which operates the Y-correction pointer 16 in the engine room also operates a large indicator, termed a "next astern indicator," which is mounted on the after superstructure or in any other suitable position where it will be clearly visible to the next ship astern. A commanding officer, in applying a correction, is thus enabled to take into account any correction being applied by the next ship ahead and the "handing on" down the line of large cumulative errors is thus obviated.

The next astern indicator preferably takes the form of a set of ten lamps 63 connected to a rotary switch 64 by means of which they may be lighted selectively in accordance with a code. The switch 64 is operated by a self-synchronous motor 65 in circuit with the transmitter 14, so that the lamps 63 are made to light up in different groupings in accordance with the correction which is appearing on the dial 18, taken, for example, in units of 10 yards. A small dial 66 associated with the switch 64 indicates that the motor 65 is functioning.

Circumstances arise in which it is desirable to obscure the next astern indicator to avoid confusing the ship astern. For example, assuming a commanding officer has just signalled a correction, and circumstances then arise which render this correction unnecessary: he immediately signals to the engine room to disregard the correction ordered, and means are provided whereby the transmission of such an order automatically causes the lamps 63 to become extinguished. Coupled to the handwheel 60 of the order transmission system is a contact device 67 by means of which, when certain of the standard orders (such as "disregard") are transmitted, a relay 68 is operated which breaks the power supply to the rotary switch 64 and thus extinguishes the lamps 63. The relay 68 also controls a small indicator 69 on the Y-corrector 42 which shows when the lamps 63 are in operation. A dimming resistance 70 is included in the circuit of the lamps 63.

To indicate the preferred distribution of the apparatus over the ship, Figure 1 is divided by interrupted lines into four rectangular zones. The zones are indicated by the Roman numerals I to IV in the bottom right hand corner of each rectangle. Zone I represents the after superstructure, zone II the fore bridge, zone III the wheel house and zone IV the engine room.

Repeat indicators coupled to the various transmissions are located in suitable parts of the ship. For example, an indicator 71 associated with the Y-corrector 42 and operated by the transmitter 14 repeats the indication given by the engine room pointer 16. A similar indicator 72 is located on the fore bridge. Also located on the fore bridge are (1) a repeat station indicator 74, the crosswires of which follow the movements of the wires X5 and Y5 of the station indicator 41, and (2) a "lubber's line indicator" 75 to show which of the lubber's lines 56, 58, 59 is in use.

In the arrangements of the Y-control system shown in Figure 1 the assumption is made, as previously stated, that the ship's speed is proportional to the mean speed of the port and starboard engines. The accuracy of this assumption is seriously invalidated unless the speeds of the two engines are substantially equal, and for this reason a small additional instrument termed an engine speed balancer is preferably incorporated. This comprises a pointer 76 connected to a differential 77 in which drives from the two engines are coupled in opposition, the arrangement being such that when the speeds of the engines are equal, the pointer 76 will remain at rest. The engine room artificer is thus warned if any serious difference exists between the two speeds.

Figure 7:
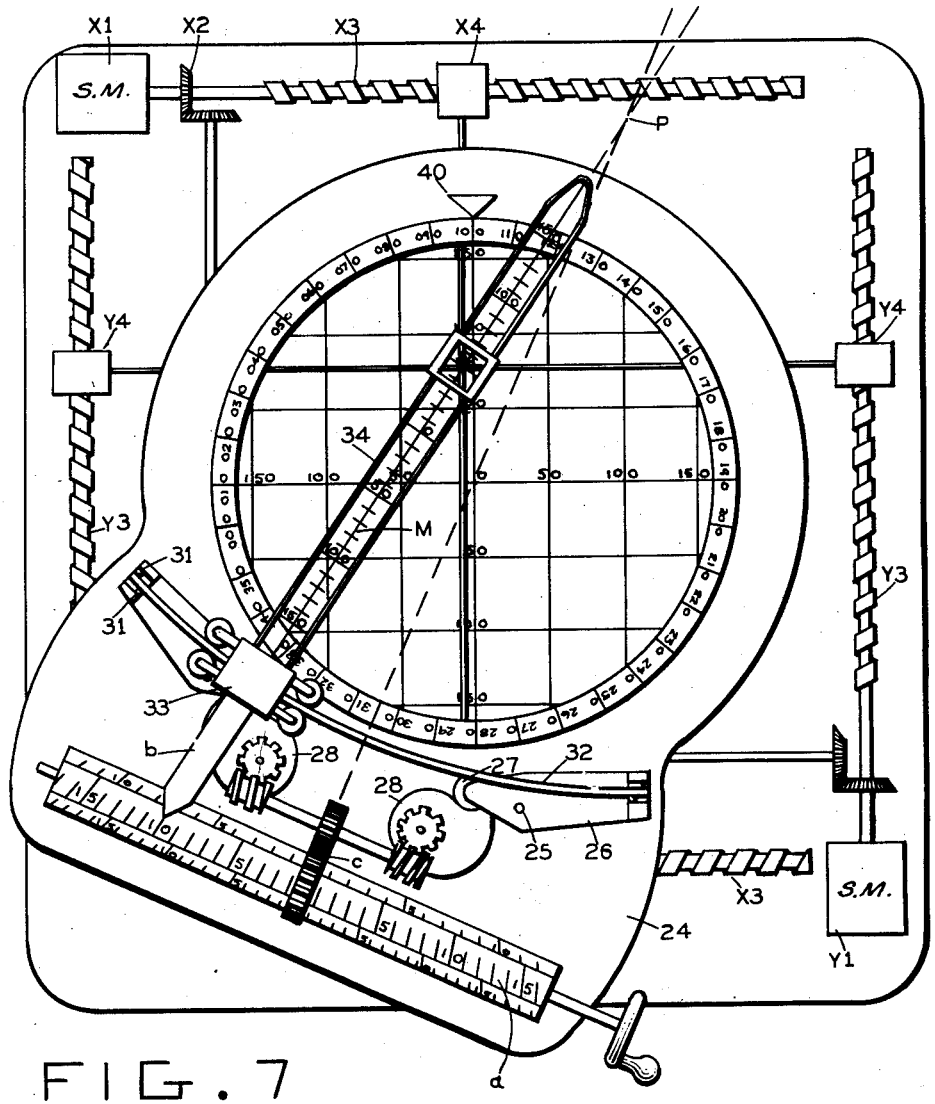
Figure 7 is a plan view showing a modified form of the termed "station indicator" instrument.

Various modifications may be made to the apparatus described above. In the station indicator 41, for example, the mechanism illustrated in Fig. 7 may replace the auxiliary pointer 37. Mounted on the carriage 24 is a rotatable drum $a$, polygonal in cross-section, on each face of which is marked a scale. As the pointer carriage 33 is moved round the rail 32, an index $b$ mounted on this carriage moves over the drum $a$ in a substantially longitudinal direction so that the position of the pointer 34 may be read off on the particular scale which is uppermost. These scales are all arranged so that their zero marks coincide with the index $b$ when the pointer 34 is at its zero position, and are calibrated to indicate the number of degrees through which the line M has moved in either direction from this position about the centre of curvature P of the rail 32 as the pointer carriage 33 is moved round the latter. The distance between adjacent degree marks must, of course, vary with the curvature of the rail, so each scale is calibrated to correspond with a different curvature, and that scale is selected for use which corresponds with the particular curvature employed. This construction therefore limits the use of the apparatus to a series of fixed values for the correct range R'. The selection of the scale is preferably automatic, the means employed for bending the rail also serving to rotate the drum as, for example, by means of the gearing c so that the correct scale is exposed. This scale will be referred to as the "pointer setting scale." In operation, when the carriage 24 has been set as previously described, the pointer carriage 33 is adjusted on the rail so that the index b associated therewith indicates on the pointer setting scale the bearing error— that is the number of degrees by which the actual bearing B of the guide differs from the correct bearing B'; according to whether this error is positive or negative the pointer 34 is moved to one side or the other from its zero position. It will be obvious that the line M now passes over the point representing the ship's actual position, so that the final adjustment of the cursor 35 may now be made as previously described. Other types of calibrated drums or instrumentalities may obviously be employed for setting pointer 34 in accordance with the bearing error in place of the specifically illustrated polygonal form of drum a shown in Fig. 7.

Figure 8:
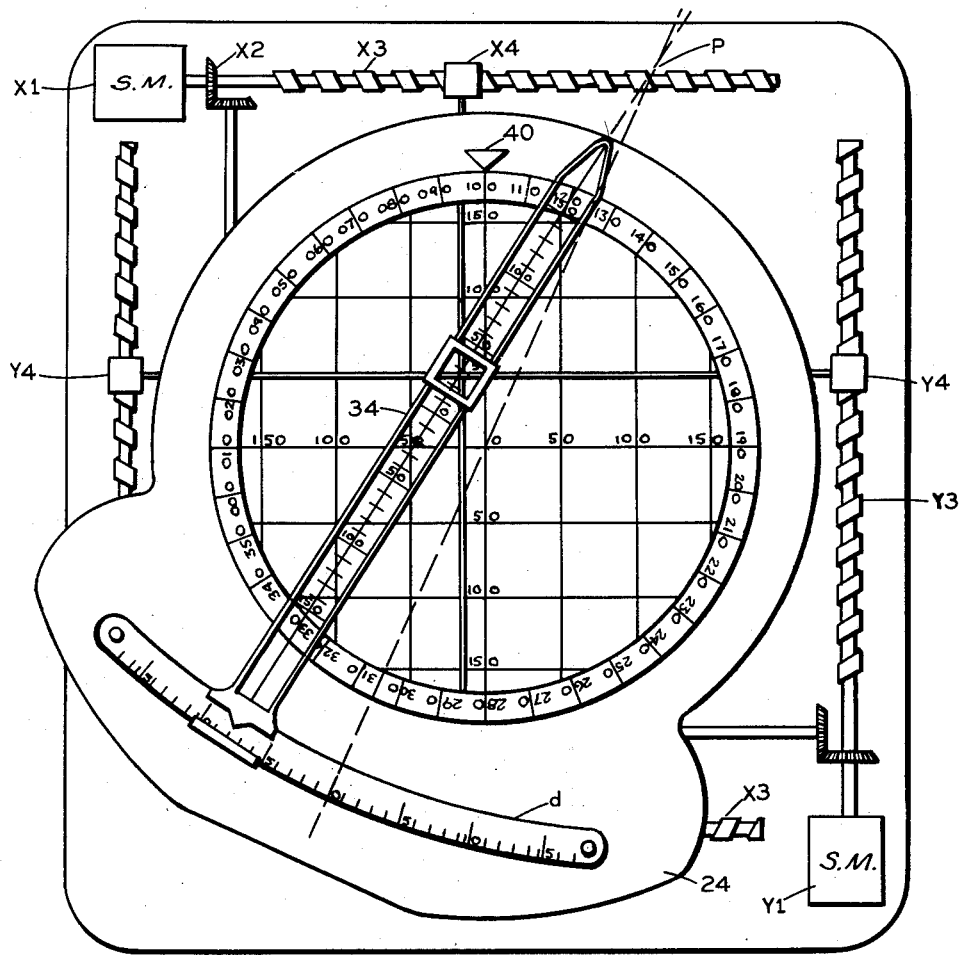
Figure 8 is a plan view illustrating a further form of the "station indicator" instrument in which an interchangeable fixed radius type of rail is employed.

In certain cases, for the sake of simplicity, the flexible rail described may be replaced by a set of interchangeable rails of fixed radii, each having associated therewith its own pointer setting scale. Here again it will be obvious that this construction can only be used for a series of fixed values for correct range R'. An arrangement, such as noted above, with a fixed rail d in position is shown in Fig. 8 of the drawing.

Figure 9:
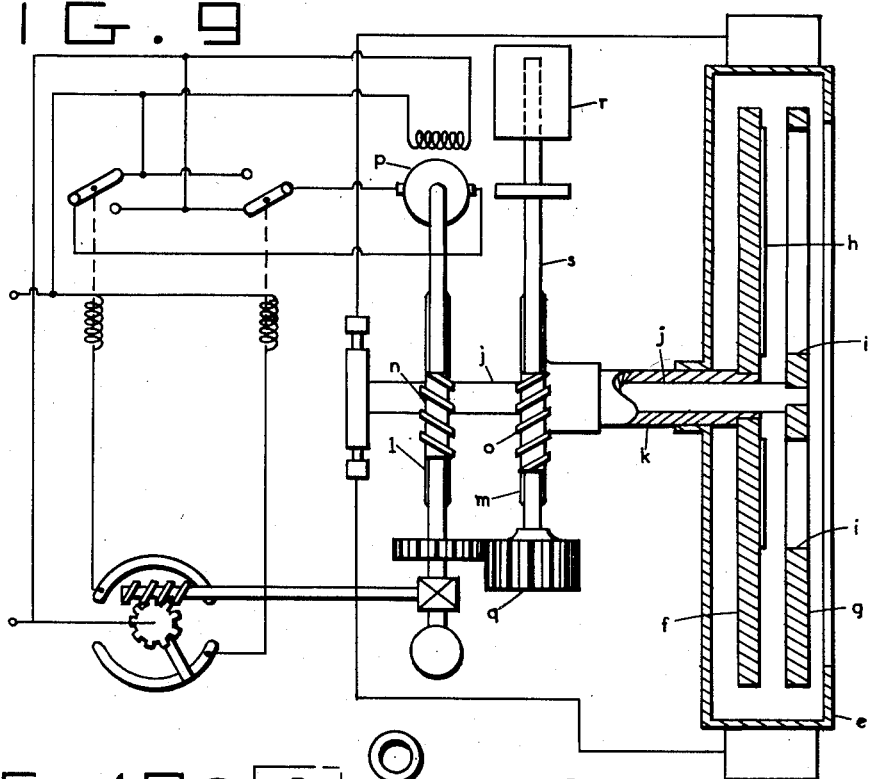
Figure 10:
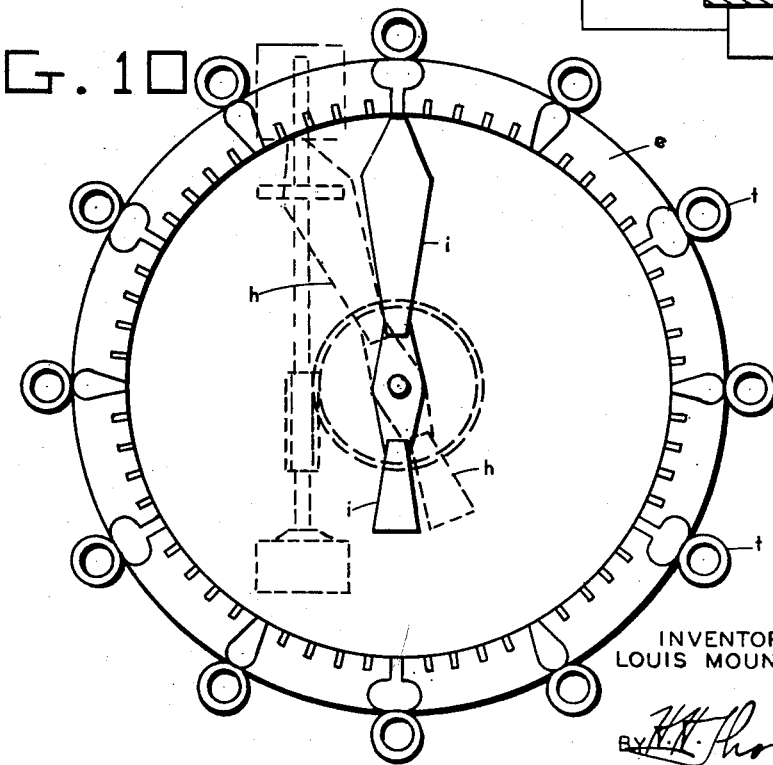

The next astern indicator may take various alternative forms. In the form shown in Figs. 9 and 10 this comprises a large dial round which moves a pointer operated by a power follow-up system of any convenient type from the transmitter 14, Figure 1. The dial comprises an annular rim e on which the graduations are marked, and behind which rotate a pair of discs (f and g) one behind the other. The inner disc f has a pointer h boldly marked thereon, while the outer disc g has corresponding cut away portions i through which the pointer h is visible when the two discs are correctly aligned. It may be noted here that a white pointer on a black ground has been found to give good results, but any other colour scheme may obviously be employed. The outer disc g is mounted on a spindle j passing through a hollow spindle k which carries the inner disc f, and these spindles carry at their inner ends a pair of worm wheels l, m with equal numbers of teeth. These mesh with a pair of worms n and o respectively, which are driven by the power motor p operating the indicator and are interconnected by gearing g so that they rotate with equal speeds in opposite directions; as, however, one has a right-hand and the other a left-hand thread, they drive the worm wheels l and m in the same direction, so that the two discs f, g are normally caused to rotate synchronously with the pointer h always visible. Mechanism is provided for causing the pointer to disappear in the circumstances in which the lamps 63, previously described, were extinguished. This mechanism comprises an electromagnet r which, when energised, moves the spindle s of the worm o additionally rotating the inner disc without affecting its rotation received from motor p; the worm o and worm wheel m are thus utilised in the manner of a rack and pinion to displace the inner disc f relatively to the outer disc g and cause the pointer h to disappear. In this construction the operation of the relay 68 in the manner previously described energises the above-mentioned electromagnet r and also puts out of operation the illuminating system used for rendering the next astern indicator visible at night.

This illuminating system preferably comprises a series of blue lights t which are disposed round the periphery of the dial at points corresponding to the graduations thereon and are illuminated selectively to indicate the position of the pointer. Alternatively a suitable floodlighting system may be employed.

Figure 11:
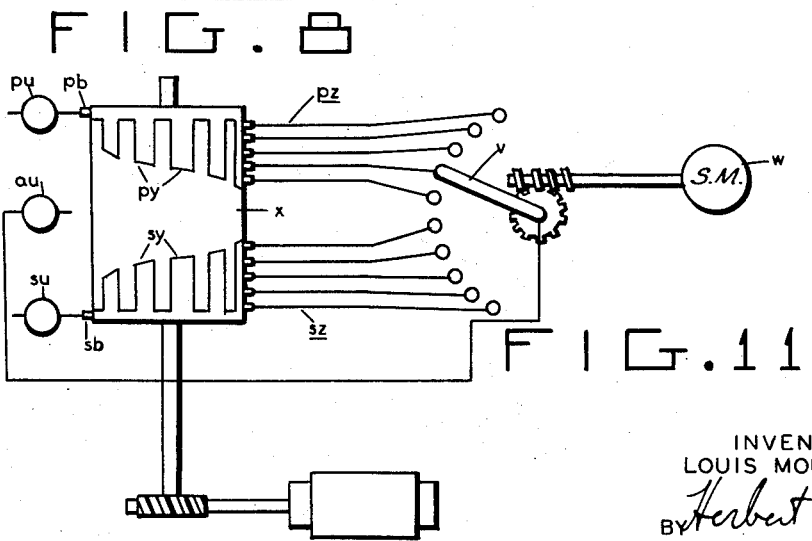
Figures 9, 10 and 11 are detail views showing modified arrangements of astern indicators as aplicable for use with the disclosed station keeping apparatus.

In a further modified arrangement, as shown in Fig. 11, the next astern indicator comprises simply three lamps (au, pu and su) arranged in amidships, port and starboard positions, respectively. When a correction is given, either the port or starboard lamp (according to whether the correction is "advance" or "drop") is caused to emit groups of flashes, the number of flashes in each group being equal to the number of units of ten yards in the correction given. Thus if a correction of "advance 30 yards" is given, the port light pu is caused to emit groups of three flashes, and continues to do so until the pointer 16, Fig. 1, has dropped to the twenty yards mark, when groups of two flashes are given. The amidships lamp au is continuously alight to give a clear indication as to which of the other lamps is in operation. The system is operated by a selector switch v controlled by a self-synchronous motor w connected to the transmitter 14, in conjunction with a continuously operating contact breaker for producing the flashing effect. This contact breaker comprises a continuously rotating drum x provided with two sets of contact strips py, sy of varying lengths, these sets being connected through brushes pb, sb to the respective lamps pu and su. Sets of brushes pz, sz associated with the selector switch v engage the sets of contact strips py, sy, respectively, the arrangement being such that each brush engages a various number of such contact strips according to its axial position with respect to the drum. In this manner, the appropriate lamp is caused to emit the required number of flashes during each revolution of the drum x.

In a simplified form of the apparatus, the cross wires X5 and Y5 and associated mechanism in the station indicator may be dispensed with. The components x and y of the ship's displacement having been found as described, the following procedure may be adopted. The y component is set on the Y-control system by operating the handwheel 44, the indicator 71 being used to determine when the required correction has been indicated by the engine room pointer 16. Simultaneously the X-corrector 46 is operated until the x component is indicated on the external scale associated with this instrument. The apparatus will then function as previously described to restore the ship to its correct station.

In a further simplification, the X-corrector may be dispensed with. Operation of the Y-system as described will bring the ship "to rest" on the X-axis, when a simple switch may be operated to bring one of the lateral lubber's lines 58 or 59 into use, according to the sign of the component x; the ship may thus be made to "creep" along the X axis until it is found by observation (of either range or bearing, according to which is more convenient) that the ship is in its correct position. Conversely, the Y-corrector could be dispensed with, the X-corrector being used as described to bring the ship to the Y axis, after which a temporary variation of speed could be made until either range or bearing was found by observation to be correct, when the ship would be in its correct station.

In certain simple cases it may not be necessary to use the station indicator. Thus in a "line ahead" formation, bearing corrections are unnecessary if the helmsman can see the preceding ship in the line, which acts as the guide, while range corrections may be dealt with directly by the Y-control system. In a "line abreast" formation, the $y$ component may be determined directly by taking an observation from a pelorus along a line of sight parallel with the beam, and seeing upon what part of the adjacent ship this falls. The $y$ component may then be read directly from a diagram showing a side elevation of the class of ship together with a scale of yards.

Alterations of formation are in general dealt with by the system in the same manner as errors of station, it being only necessary to set the new values of correct range and bearing on the station indicator and then to proceed as described above in order to bring the ship into its new correct position. In the event of a change of formation involving corrections of greater magnitude then can be dealt with by the station indicator, it will be necessary to con the ship into approximately the correct position before applying the system described for bringing it accurately into station.

Any alteration in the speed of the flotilla is dealt with simply by setting the new speed on the revolution telegraph 11a, which automatically alters the speed ratio of the continuously variable gearing, so that the engine room artificer has to modify the engine speed in order to keep the pointer 16 on the zero mark.

A further advantage of the invention may here be noted. A record is normally kept of the distance travelled by the ship as computed from the speed and the time during which the ship has been travelling at that speed. In the past, when an increase of speed has been ordered, the calculation has been complicated by the fact that it has been necessary to make allowance for the transitional period during which the speed has been increasing from the old to the new value. The use of the apparatus according to the present invention overcomes this disadvantage. When the new speed is set on the apparatus, the pointer 16 will immediately drop behind, and in order to restore it to the zero position the ship must travel for a certain time at a speed greater than the required speed: when, however, the pointer has been so restored, the actual distance travelled by the ship will be substantially the same as if it had attained the required speed in the small time necessary to reset the continuously variable gearing, and had thereafter maintained that speed uniformly. For the purpose of the calculation referred to it can therefore be assumed that the ship has "jumped" instantaneously to the new speed.

When not required for station keeping purposes, the Y-control gear may be used as an "engine tell-tale" to give a visual indication of the operation of the engines. For this purpose the constant-speed motor 7 is switched off, when the pointer 16 and other pointers operated by the transmitter 14 will rotate with a speed and in a direction dependent upon the algebraic mean of the speeds of the two engines.

The system has been described above as applied to a destroyer, but it is equally applicable to ships of the larger classes by a suitable elaboration of the apparatus, and as an example the Y-control system will now be briefly described, with reference to Figure 4, as applied to a cruiser. In this case four separate engines have to be dealt with, each housed in a separate engine room (two port and two starboard), and provision is made for transmitting corrections and orders from any of three separate positions hereinafter referred to as "control positions."

Figure 4, like Figure 1, is divided by interrupted lines into zones, zone I representing the after superstructure, zone II one of the control positions, and zone III one of the engine rooms; this constitutes a main engine room in which certain of the Y-control equipment, in addition to that which is duplicated in all the engine rooms, is housed.

In so far as is applicable, the reference numerals used in Figure 1 are again used for corresponding pieces of apparatus in Figure 4. In addition, the suffixes P and S are used for apparatus specifically associated with the port or starboard sides respectively, and the suffixes P1, P2, S1, S2 for pieces of apparatus specifically associated with each of the four engines.

Each control position is equipped with a Y-corrector 42, and the leads from this are taken to a change-over switch 78 which is set, in accordance with which control position is being used, to connect the appropriate Y-corrector with the rest of the system.

Provision is made for separate speed adjustment of the port and starboard engines, separate revolution telegraphs 11aP and 11aS being provided in respect thereof. Correspondingly two continuously-variable gear systems 8P—11P and 8S—11S are operated from the constant speed motor 7, one in respect of the port and one in respect of the starboard engines, and each in turn operates a separate system of mechanism. These systems of mechanism are identical in operation, and it is therefore necessary to describe only one of them.

The speed-adjustment arm 11P of the port gearing is operated from the revolution telegraph 11aP, and the output shaft 6P passes into a differential 5P into which also passes a correction shaft 17 operated by the correction-transmission system from the Y-corrector 42. This system comprises a self-synchronous transmitter 43 and three self-synchronous motors 45 mechanically coupled together for added power.

The third member of the differential 5P drives two shafts 12P1, 12P2 which are associated respectively with the forward and after engines, and here again a duplication of mechanism takes place, so that it is necessary to consider only one engine.

The shaft 12P1 is connected in a differential 13P1 in opposition to a shaft P1 driven by the engine, so that the resultant shaft from this differential should be at rest if the engine speed is correct. This shaft operates a self-synchronous transmitter 14P1. The shaft 12P2 is associated with a similar system denoted by similar reference symbols in which the suffix P2 replaces the suffix P1. The starboard revolution telegraph 11aS is connected to a system which is exactly similar to that described above, and is denoted by a similar system of reference symbols in which P is replaced by S.

Figure 6:
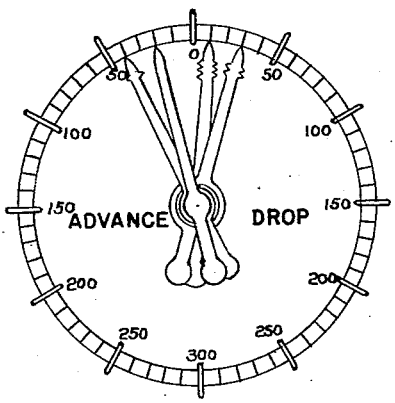

There are thus four transmitters 14P1, 14P2, 14S1, 14S2, one associated with each of the four engines. These transmitters (hereafter referred to for convenience as the transmitters 14) are connected to a compound indicator 79 which corresponds with the indicator 16, 18 in Figure 1. The construction of this indicator is shown schematically in Figure 4, and its dial is shown in Figure 6.

The indicator 79 comprises four self-synchronous motors 15P1, 15P2, 15S1, 15S2, each connected to the corresponding one of the transmitters 14, and each operating one of four separate pointers 16P1, etc. Figure 6 (hereafter termed the pointers 16) which are characteristically marked and/or coloured and are mounted on a system of hollow arbors so that they work over a common dial 18 as do the hands of a clock. One such compound indicator is mounted adjacent to each engine, and a similar indicator 71 is associated with the Y-corrector 42 in each of the control positions. It will be seen that the arrangement of the system with respect to each engine is broadly similar to the arrangement shown in Figure 1, except that the relative positions of the engine shafts and the correction shaft 17 are reversed for convenience. This makes no difference to the working of the system.

Each engine is controlled by an engine room artificer. When a distance correction is transmitted all the pointers 16 move simultaneously, and it is the duty of each engine room artificer to bring his own particular pointer back to zero. Apart from its primary function of station keeping the system provides a valuable liaison between the engine rooms and the control positions, since the compound indicators show simultaneously the behaviour of all four engines.

When the ship turns the engines on the outer side of the curve automatically operate slightly faster than those on the inner side, and this throws the pointers out of alignment. For this reason pointer-resetting gear is provided, and this is operated to return all pointers to zero after a turn has been completed and the ship is on the new course. This gear comprises a heart-shaped cam of known kind associated with each pointer in each of the compound indicators: a roller is caused to press on each cam by spring action, and this tends to restore the pointer to the zero position by coming to rest in the V at the top of the "heart," but is normally prevented from doing so by the action of the self-synchronous motor associated with the pointer. When a button 80 on the Y-corrector 42 is pressed, a relay 81 is energised which closes the circuit to a solenoid associated with each compound indicator. These solenoids (which are indicated schematically at 82 in Figure 4) operate means for de-clutching all the self-synchronous motors from their associated pointers, with a result that each pointer is immediately zeroised by the heart-shaped cam mechanism. The relay 81 is provided with a suitable delay action to ensure that all the pointers have time to return to zero before the motors are re-connected.

For the purpose of operating the "next astern" indicator 63, the engine transmitters 14 operate motors 83P1, etc., whose motions are averaged by means of differentials 84, the final resultant shaft operating a single transmitter 85 which in turn operates the next astern indicator. This may be of any of the types previously described, and like the compound indicators is provided with zeroising mechanism. As shown, the next astern indicator takes the same form as in Figure 1, and the parts thereof are indicated by the same reference numerals. The zeroising mechanism is located between the rotary switch mechanism 64 and the two self-synchronous motors 65 by which this is operated.

The constant speed motor 7, continuously variable gears and associated differentials and transmitters are preferably mounted together to form a compact unit located in the main engine room. In this engine room is also located a switch 86 which controls the power supply to the transmitters 14 and constant speed motor 7. A further switch 87 is provided in the circuit of this motor for use when the system is employed as an engine tell-tale in the manner previously described: in such a case the switch 86 is closed and the switch 87 left open.

The constant speed motor 7 is arranged to drive a clock mechanism 88, the gearing being such that if the motor is running at the correct speed the clock will keep the right time. This provides a convenient check on the operation of the motor.

The sets of apparatus at the control positions are mounted in suitable casings, and as in the destroyer system provision is made for the transmission of standard orders, certain of which cause the next astern indicator to be put out of operation. This latter result is achieved by mechanism similar to that used in Figure 1, and denoted by the same reference numerals. The lines 89 from the transmitters 14 and zeroising relay 81 are taken to further compound indicators, similar to 71 and 79, which are located in the other engine rooms and other control positions.

The arrangement of the station indicator, X-corrector and associated apparatus in a cruiser adopting the Y-control system according to Figure 4 may be substantially identical with that shown in Figure 1. The connections to the station indicator motor Y1 may conveniently be taken from the next astern indicator transmitter 85, which averages the movements of the four transmitters 14. The drive to the transmitter 53 (Figure 1) which operates the X-corrector may be taken either from a system of differentials averaging the movements of the four shafts P1, P2, S1, S2, or from one of these shafts only.

Figure 5 illustrates an arrangement which may be used alternatively to that shown in Figure 4. In this case four separate sets of apparatus, as hereinafter described, are used in respect of each engine.

The port revolution telegraph 11aP is coupled to an indicator 11bP1 and to a continuously variable gear system 8P1—11P1 in the manner previously described. This is associated with a shaft P1 from the appropriate engine, and with further elements 5P1, 6P1, 7P1, 12P1, 13P1, 14P1, 17P1, 45P1 having the same functions as the correspondingly numbered parts in Figure 1. Exactly similar systems, denoted by similar reference numerals with the suffixes P2, S1, S2 are provided in respect of the other three engines in a manner that will be clear from the drawings. The switches 86, 87 are replaced by two pairs of switches: a pair 86(1), 87(1) in respect of both forward engines (port and starboard) and a similar pair 86(2), 87(2) in respect of both after engines. As regards its remaining parts the system is identical with that shown in Figure 4, and these parts are identically numbered. The four constant speed motors TP1, TP2 etc, may be independent, or may be synchronous motors operated by a common supply of alternating current.

In a ship having only two engines, instead of averaging the speeds of the engines by a differential 3 as in Figure 1, each engine may be treated individually in the manner of either Figure 4 or Figure 5. Thus if all the parts in Figure 4 denoted by reference symbols having the suffix S were omitted, this figure would represent such a system. A similar result could be achieved in various other ways, as will be obvious from a contemplation of these figures. In such systems each compound indicator such as 71, 79 would, of course, have only two pointers.

In all the systems shown, the various sets of apparatus are, as previously stated, preferably mounted in suitable casings to form compact units, and such casings may also contain switches for controlling the various pieces of electrical equipment and suitable illuminating means for the various dials.

If desired, instead of an engine room artificer controlling the engines in accordance with the movements of the pointer or pointers 16, the speed of the engines may be controlled automatically by a servo system operated directly by the transmitter or transmitters 14. Correspondingly the X-control system may be combined with any convenient form of automatic steering apparatus.

By the operation of the system according to the invention it has been found possible to maintain warships proceeding in formation in their correct stations for periods of many hours without the necessity for any corrections arising. This leads to a great increase of efficiency and, by virtue of the fact that the engines are running steadily for long periods, a considerable saving of fuel. A further saving of fuel arises from the fact that owing to the operation of the "next astern" indicators ships are prevented from making unnecessary corrections in the manner previously explained.

It will be understood that without departing from the scope of the invention any of the detailed mechanisms described may be replaced by known mechanical or electrical equivalents.

Having now particularly described and ascertained the nature of my said invention, and in what manner the same is to be performed, I declare that what I claim is:

1. Station keeping apparatus comprising means for indicating a component of the displacement between the actual position of a ship and its desired station with respect to a guide, said component being taken along the course of said guide, a member displaceable from a neutral position, means for displacing said member from its neutral position to a position of correspondence with said indication, means for moving said member back toward its neutral position at a rate proportional to the difference in the speeds of said ship and said guide, and means for changing the speed of said ship to return said member to its neutral position.

2. Station keeping apparatus as in claim 1, wherein said means for moving said member back towards its neutral position includes a differential, means for actuating one input member of said differential at a rate proportional to the speed of said ship, means for actuating a second input member of said differential at a rate proportional to the known speed of said guide, and means for actuating said displaceable member proportionately to the movements of the third member of said differential.

3. Station keeping apparatus comprising means for indicating a component of the error between the actual position of a ship and its desired station with respect to a guide, said component being taken in the direction being steered by said ship and its guide, a differential, means for actuating one input member of said differential at a rate proportional to the speed of said ship, means for actuating a second input member of said differential at a rate proportional to the known speed of said guide, means for actuating said error indicator proportionately to the movement of the third member of said differential, and means for changing the speed of said ship to reduce said error indication to zero.

4. Apparatus for providing a continuous approximate indication of the distance a ship moves out of station with respect to its guide in the direction of the course being steered by its guide, comprising a differential, means for rotating one input member of said differential at a rate proportional to the known speed of said guide, means for rotating a second input member of said differential at a rate proportional to the speed of said ship, an indicator, and means for actuating said indicator by the third member of said differential, whereby said indicator indicates said distance.

5. Apparatus for providing a continuous approximate indication of the distance a ship is out of station with respect to its guide in the direction of the course being steered by its guide, comprising means for rotating a first member at a rate proportional to the known speed of said guide, means for rotating a second member at a rate proportional to the speed of said ship, means for integrating the difference between said two rates, and an indicator for indicating the integrated difference, whereby said indicator indicates said distance.

6. Apparatus as in claim 5, wherein said indicator is actuated at a rate corresponding to the difference of said two rates.

7. The method of station keeping for ships, comprising the steps of indicating two components of the displacement of said ship from its correct station with respect to a guide, one of said components being parallel to the course of said guide and the other being perpendicular to said course, displacing an indicator from a neutral position by an amount proportional to said parallel component, actuating said indicator at a rate proportional to the difference in speeds of said ship and said guide, and adjusting the speed of said ship to return said indicator to said neutral position.

8. The method of station keeping for ships comprising the steps of indicating a component of the displacement of said ship from its desired station with respect to a guide, said component being parallel to the course of said guide, displacing an indicator from a neutral position by an amount proportional to said parallel component, actuating said indicator at a rate proportional to the difference in speeds of said ship and said guide, and changing the speed of said ship to return said indicator to said neutral position.

9. The method of restoring a ship to its correct perpendicular distance from a line through, and perpendicular to the course of, a guide, comprising the steps of indicating the difference between the actual and the correct distance of said ship from said line, providing a second indication proportional to the time integral of the difference between the ship's speed and the guide's speed, and adjusting the ship's speed until said indications are equal.

10. Station keeping apparatus for ships comprising means for indicating a component of the displacement between a ship and its desired station with respect to a guide, said component being taken perpendicular to the course of said guide, a member displaceable from a neutral position along said component indication, a second member also displaceable from a neutral position, means connecting said two members for maintaining proportional movements of said members, means for displacing said first member from its neutral position into correspondence with said component indication whereby said second member is displaced from its respective neutral position by an amount and in a sense corresponding to the magnitude and sense of said component, means responsive to displacement of said second member from its neutral position for ordering a fixed change of course of said ship in a sense corresponding to the sense of displacement of said second member, and means for returning said first and second members to their respective neutral positions at a rate proportional to the speed of said ship, whereby said fixed change of course is ordered for a time varying inversely with said ship's speed and directly with said component.

11. Station keeping apparatus for ships comprising a displaceable member, means for displacing said member from a neutral position by an amount and in a sense corresponding to the amount and sense of a component of the error of said ship from a desired station with respect to a guide, said component being taken at right angles to the course of said guide means responsive to displacement of said member from its neutral position for ordering a fixed change of course of said ship in a sense corresponding to said sense of displacement, and means for returning said member to said neutral position at a rate proportional to the speed of said ship, whereby said fixed change of course is ordered for a time varying inversely with said ship's speed and directly with the amount of said component error.

12. A method of station keeping for ships comprising the steps of indicating a component of displacement between said ship and its correct position with respect to a guide, said component being taken perpendicular to the course of said guide, displacing a member from a neutral position by an amount proportional to and in a sense corresponding to said component indication, indicating a fixed change of course for said ship in a sense corresponding to the sense of displacement of said member while said member is displaced from its neutral position, and returning said member to its neutral position at a rate proportional to the speed of said ship times the sine of the angle of change in course, whereby said fixed change of course is ordered for a time varying inversely with said ship's speed and directly with the magnitude of said component.

13. The method of station keeping for ships comprising the steps of indicating two components of the displacement of said ship from its correct station with respect to a guide, one of said components being parallel to the course of said guide and the other of said components being perpendicular to said course, displacing an indicator from a neutral position by an amount proportional to said parallel component indication, actuating said indicator toward its neutral position at a rate proportional to the difference in speeds of said ship and said guide, adjusting the speed of said ship to return said indicator to said neutral position, displacing a member from its neutral position by an amount and in a sense corresponding to the amount and sense of said perpendicular component, ordering a fixed change of course of said ship in a sense corresponding to said sense of displacement for the duration of the displacement of said member from its neutral position, and returning said member to its neutral position at a rate proportional to the speed of said ship.

14. The method of station keeping for ships comprising the steps of indicating two components of the displacement of said ship from its correct station with respect to a guide, one of said components being parallel to the course of said guide and the other being perpendicular to said course, displacing an indicator from a neutral position by an amount proportional to said parallel component indication, returning said indicator to its neutral position at a rate proportional to the difference in speeds of said ship and said guide, changing the speed of said ship until said indicator has reached its neutral position, and changing the course of said ship by a predetermined amount and in a sense corresponding to the sense of said perpendicular component indication and for a time inversely proportional to the speed of said ship and proportional to the magnitude of said perpendicular component indication.

15. A method of station keeping for warships comprising the steps of indicating the amount and direction of displacement of a ship from its correct position with respect to a guide ship, resolving said displacement indication into a component indication taken in a direction parallel to the known course of said guide, steering said ship in a direction substantially parallel to the known course of said guide, displacing a member from a neutral position by an amount proportional to said parallel component indication, moving said member back toward said neutral position at a rate proportional to the difference between the speed of said ship and that of said guide, and effecting a controlled variation in the speed of said ship to return said member to said neutral position, thereby eliminating the error in the ship's position in the direction parallel to the course of said guide.

16. A method of station keeping for warships comprising the steps of indicating the amount and direction of displacement of a ship from its correct position with respect to a guide ship, resolving said displacement indication into a component indication taken in a direction parallel to the known course of said guide, steering said ship in a direction substantially parallel to the known course of said guide, providing a continuous indication proportional to the time integral of the difference between the known speed of said guide and the speed of said ship, and controlling the speed of said ship to cause said last named indication to become just equal to said parallel component indication, thereby eliminating the error in the ship's position in the direction parallel to the course of said guide.

17. A method of station keeping for warships comprising the steps of indicating the amount and direction of displacement of a ship from its correct position with respect to a guide ship, resolving said displacement indication into a component indication taken in a direction parallel to the known course of said guide, steering said ship in a direction substantially parallel to the known course of said guide, displacing a first member from a neutral position by an amount proportional to said parallel component indication, moving a second member at a rate proportional to the known speed of said guide, moving a third member at a rate substantially proportional to the speed of said ship through the water, placing said first member under the control of said second and third members to be moved toward said neutral position at a rate proportional to the difference in the rates of said second and third members, and effecting a controlled variation in the speed of said ship to return said first member to said neutral position, thereby eliminating the error in the ship's position in the direction parallel to the course of said guide.

18. A method of station keeping for warships comprising the steps of indicating the amount and direction of displacement of a ship from its correct position with respect to a guide, resolving said indication into component indications taken in directions perpendicular and parallel to the known course of said guide, displacing a member from a neutral position by an amount proportional to said perpendicular component indication, steering said ship in a direction having a predetermined small angle with respect to the course of said guide to thereby give the ship a component speed in the direction perpendicular to the guide course, moving said member toward said neutral position at a rate proportional to said perpendicular component of the ship's speed, and restoring the course of said ship to parallelism with that of the guide substantially when said member has returned to its neutral position, thereby eliminating the error in the ship's position in a direction perpendicular to the course of the guide.

19. A method of station keeping for warships comprising the steps of indicating the amount and direction of displacement of a ship from its correct position with respect to a guide, resolving said indication into component indications taken in directions perpendicular and parallel to the known course of said guide, steering said ship in a direction having a predetermined small angle with respect to the course of said guide thereby giving the ship a component speed in the direction perpendicular to the guide course, providing a continuous indication proportional to the time integral of said perpendicular component of the ship's speed, and restoring the course of said ship to parallelism with that of the guide substantially when said last named indication becomes equal to said perpendicular component indication, thereby eliminating the error in the ship's position in a direction perpendicular to the course of the guide.

20. Apparatus for providing a continuous approximate indication of the distance a ship moves with respect to its guide in a direction at right angles to the course being steered by said guide, comprising an indicator for registering said movement, means for displacing said indicator at a rate proportional to the speed of said ship, and means for varying the direction of displacement of said indicator in accordance with the sense of the angular deviation between the course of said ship and the course of said guide.

21. Apparatus as claimed in claim 20, further including a second indicator mounted on said ship to be visible from a ship astern, and means for moving said second indicator proportionately to the movement of said first indicator.

22. Apparatus as claimed in claim 20, further including a graduated dial mounted on said ship to be visible from a ship astern, a pointer concentrically mounted on said dial, means for rotating said pointer proportionately to the movement of said indicator, a mask also concentrically mounted on said dial and connected to be rotated in synchronism with said pointer, said mask having an opening normally aligned with said pointer, and manually operable means for angularly displacing said mask with respect to said pointer to render said pointer invisible to said ship astern.

23. Apparatus as claimed in claim 20, further including two lamps mounted on said ship to be independently visible from a ship astern, switching means responsive to the displacement of said indicator from a neutral position for causing one or the other of said lamps to periodically emit groups of one or more flashes, the direction of said displacement determining which of said lamps flash, and the magnitude of said displacement controlling the number of flashes per group.

24. The method of station keeping for ships comprising the steps of displacing a member from a neutral position by an amount and in a sense corresponding to the amount and sense of the difference between the actual and correct distances of the ship on a line perpendicular to the course of a guide, causing a predetermined change in the course of the ship in a direction to reduce the difference between the actual and correct distances, and returning said member to its neutral position at a rate proportional to the speed of the ship.

LOUIS MOUNTBATTEN.